United States Patent
Andre

(10) Patent No.: US 8,382,143 B2
(45) Date of Patent: Feb. 26, 2013

(54) MOTORIZED ROAD VEHICLE FOR TRANSPORTING PASSENGERS, CAPABLE OF RUNNING ALONE AND OF BEING ARTICULATED TO OTHER VEHICLES TO FORM A ROAD TRAIN

(75) Inventor: Jean-Luc Andre, Molsheim (FR)

(73) Assignee: Lohr Industrie, Hangenbieten (FR)

( * ) Notice: Subject to any disclaimer, the term of this patent is extended or adjusted under 35 U.S.C. 154(b) by 78 days.

(21) Appl. No.: 12/990,904

(22) PCT Filed: May 5, 2009

(86) PCT No.: PCT/FR2009/000527
§ 371 (c)(1),
(2), (4) Date: Jan. 6, 2011

(87) PCT Pub. No.: WO2009/141526
PCT Pub. Date: Nov. 26, 2009

(65) Prior Publication Data
US 2011/0108334 A1 May 12, 2011

(30) Foreign Application Priority Data
May 6, 2008 (FR) .................................... 08 02518

(51) Int. Cl.
*B60D 5/00* (2006.01)
(52) U.S. Cl. ........................................ 280/403; 280/408
(58) Field of Classification Search ................ 180/14.1, 180/14.2; 280/403
See application file for complete search history.

(56) References Cited

U.S. PATENT DOCUMENTS

| | | | | | |
|---|---|---|---|---|---|
| 3,246,714 | A | * | 4/1966 | Middlesworth et al. | 180/14.1 |
| 3,339,658 | A | * | 9/1967 | Peterson | 180/14.2 |
| 4,762,191 | A | * | 8/1988 | Hagin et al. | 180/14.2 |
| 4,794,867 | A | | 1/1989 | Titz | |
| 7,658,396 | B2 | | 2/2010 | Koch et al. | |
| 2005/0104321 | A1 | * | 5/2005 | Koch et al. | 280/403 |
| 2006/0170188 | A1 | | 8/2006 | Negre et al. | |
| 2010/0044998 | A1 | | 2/2010 | Franchineau | |

FOREIGN PATENT DOCUMENTS

| | | |
|---|---|---|
| DE | 44 11 241 A1 | 10/1995 |
| DE | 10 2005 035 561 A1 | 3/2007 |
| EP | 0 277 305 A1 | 8/1988 |
| EP | 0 536 433 A1 | 4/1993 |
| EP | 1 864 834 A1 | 12/2007 |
| FR | 712 379 | 10/1931 |
| FR | 2 930 928 A1 | 11/2009 |
| JP | 2000 247266 A | 9/2000 |
| WO | 00/46050 A1 | 10/2000 |
| WO | 2004/014715 A2 | 2/2004 |
| WO | 2007/132121 A1 | 11/2007 |

* cited by examiner

*Primary Examiner* — Tony Winner
(74) *Attorney, Agent, or Firm* — Davis & Bujold, PLLC

(57) ABSTRACT

The road vehicle comprises a communicating door (8, 9) in each of the front (3) and rear (4) transverse faces, a part at the front and a part at the rear of the split able connection that can combine with that of another identical or same-type vehicle respectively in front (5) and behind (6) so as to constitute a disconnect able articulated connection for aligning the vehicles and obtaining a short distance between the vehicles, a projection at the front or at the rear at the inter-vehicular passenger access, a course set point for the vehicle (6) behind using a system for directional control of the vehicle behind. The road vehicle is applicable to urban public transport vehicles which can form a road train.

16 Claims, 4 Drawing Sheets

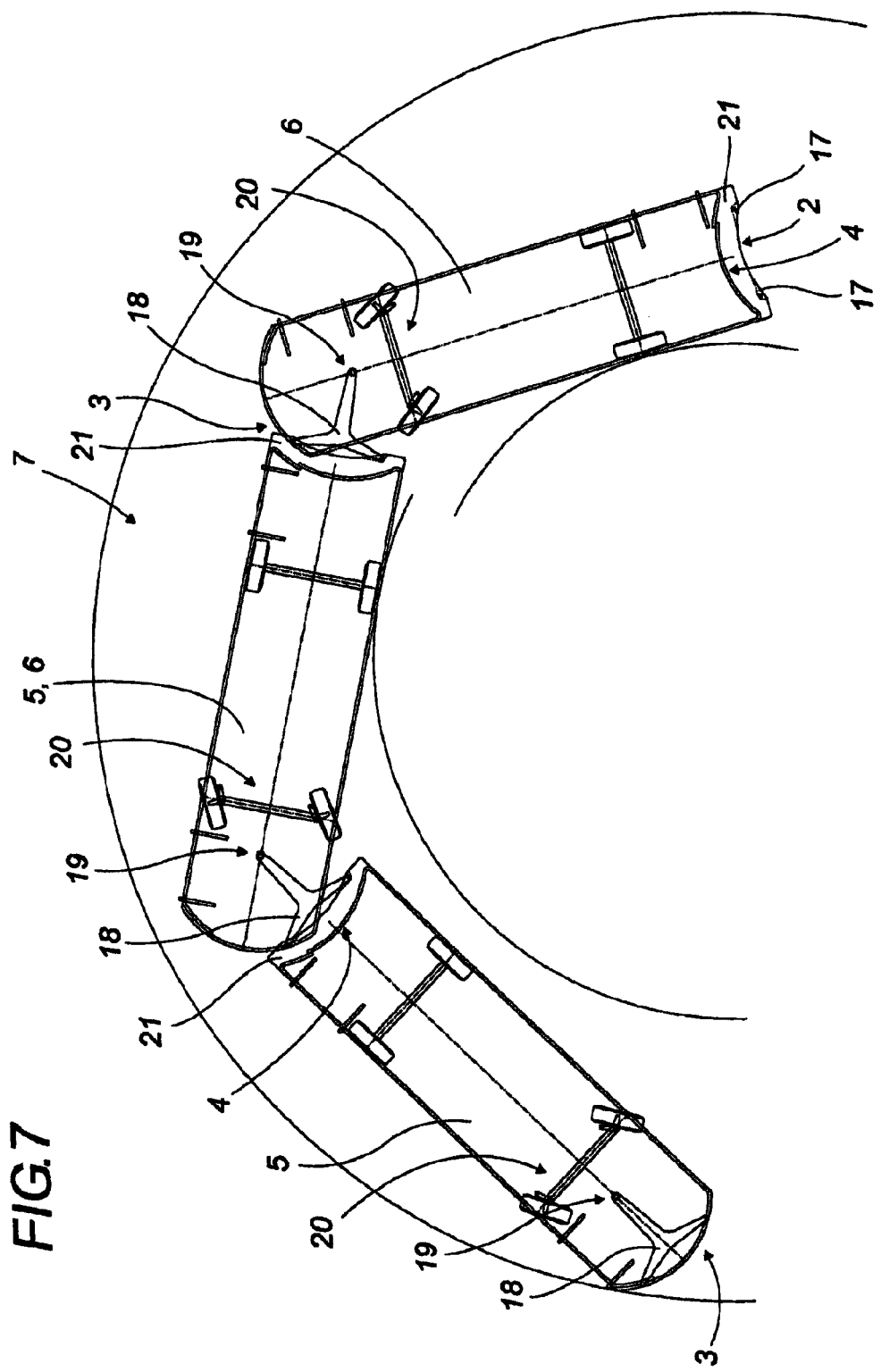

MOTORIZED ROAD VEHICLE FOR TRANSPORTING PASSENGERS, CAPABLE OF RUNNING ALONE AND OF BEING ARTICULATED TO OTHER VEHICLES TO FORM A ROAD TRAIN

This application is a National Stage completion of PCT/FR2009/000527 filed May 5, 2009, which claims priority from French patent application Ser. No. 08/02518 filed May 6, 2008.

FIELD OF THE INVENTION

The present invention relates to a motor-driven road vehicle for passenger transportation, either having an independent energy supply or connected to an energy network, which can be connected to other road vehicles of the same type to constitute a train set or road train formed of at least two vehicles articulated to each other.

BACKGROUND OF THE INVENTION

Each road vehicle of the invention comprises a door on each of its front surfaces, each door offering passenger access to the adjacent vehicle when the vehicles are grouped in a series or in a road train.

The field of urban and inter-urban road vehicle passenger transportation is currently turning to solutions that utilize trains in a series or road trains that are assemblies formed of several motorized road vehicles and when isolated, are independently driven or connected to an energy supply network, but which can also be rapidly grouped and disconnected.

For several reasons it is necessary to reduce as much as possible the distance between vehicles in order to, among other things, make it impossible for people along the road, passers-by, cyclists, etc., to cross the convoy. Generally, for example, on small tourist vehicles, there are unattractive chains located on either side of the drawbar that provide this security.

SUMMARY OF THE INVENTION

In this scope of the invention, it is no longer necessary to provide supplemental protection to fulfill this function because of the reduced space between the vehicles when they are connected.

Implementing this passenger transportation technique using vehicles grouped in series or in road train then poses two important problems that must be resolved simultaneously. The first is the convenience, speed, and reliability of the articulated inter-vehicle connection and its disconnection, and the second, the ability of passengers to circulate from one module to another without disembarking from the car in order to arrive on time at the vehicle corresponding to the passenger's desired itinerary for the remainder of the trip after the train has been broken down into vehicles units. This passage must also be protected from lateral intrusions.

To resolve the first problem, there must be an articulation adapted for rapid disconnection and for ensuring a minimum space between vehicles, at least when in a straight line, for aligning the vehicles in a straight line, as well as steering the one or more following vehicles in a quasi-monotrace direction and automatically realigning them after curves.

To resolve the second problem, there must be access doors on the opposite facing surfaces and the shortest possible intercommunicating gangway.

BRIEF DESCRIPTION OF THE DRAWINGS

Other characteristics and features of the invention will become apparent from the following description provided by way of example and accompanied by drawings, in which:

FIG. 7 is a plane view of several road vehicles connected to one another in the same way configured for turning.

DETAILED DESCRIPTION OF THE PREFERRED EMBODIMENTS

Figure 1:
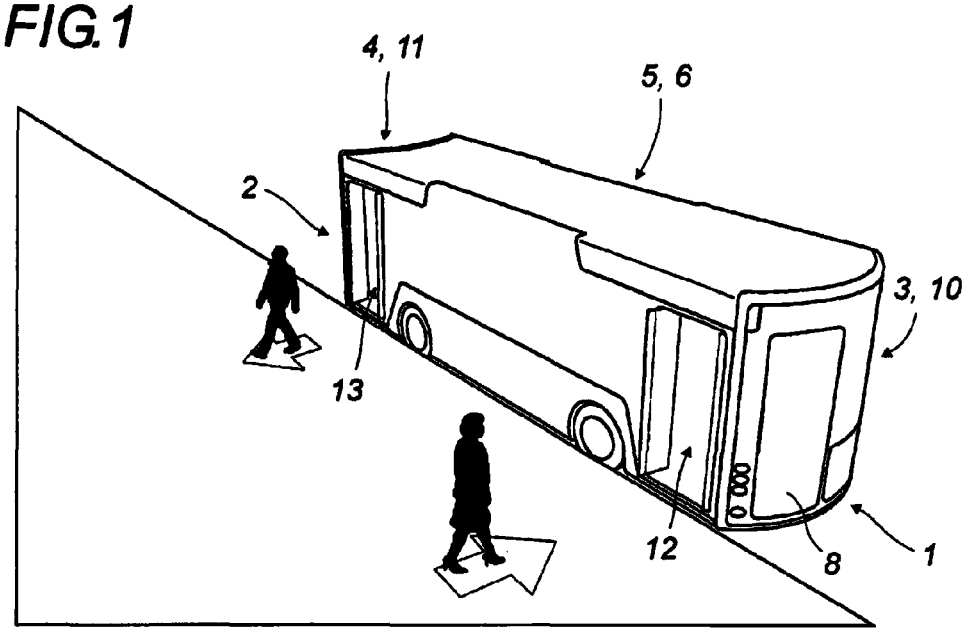
FIG. 1 is a schematic perspective of a single road module showing passengers using the lateral doors.
Figure 2:
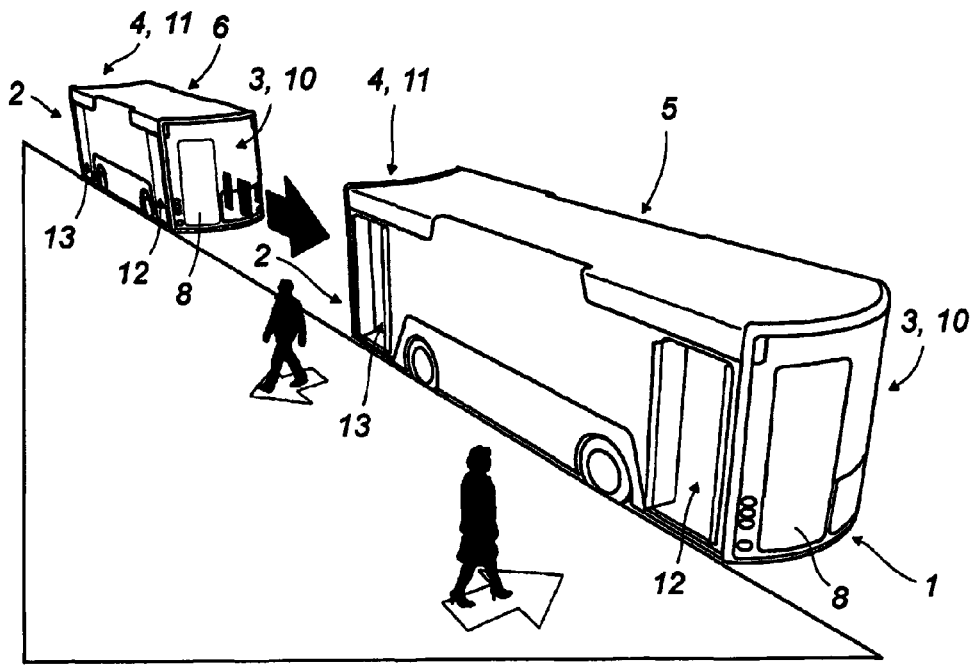
FIG. 2 is a schematic perspective showing the approach of a second road module prior to connection.
Figure 3:
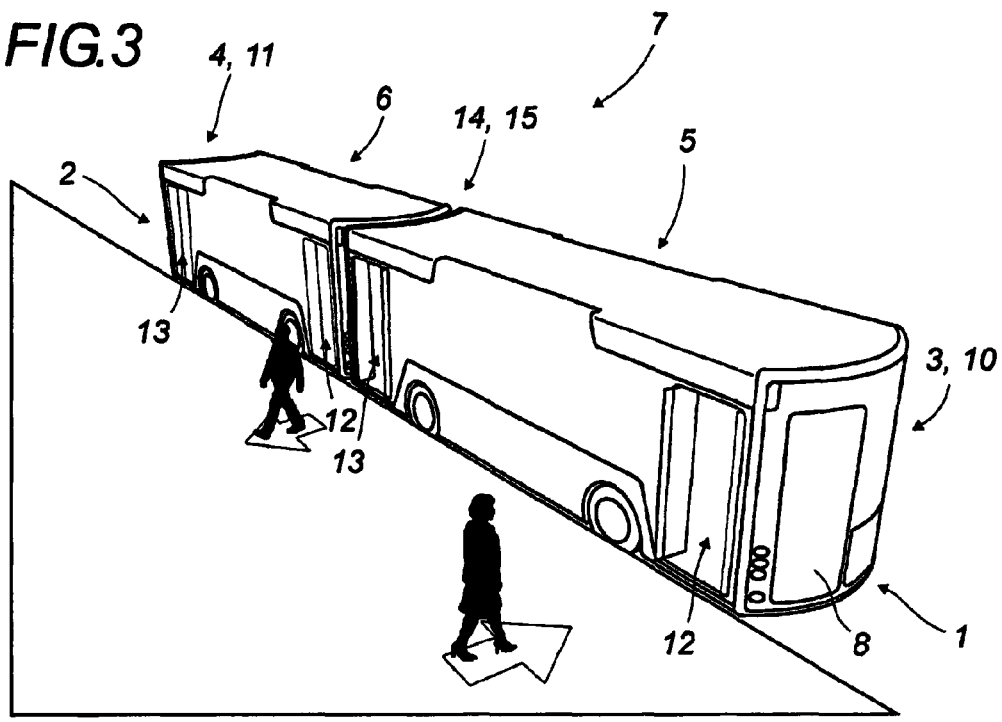
FIG. 3 is a schematic perspective showing two road vehicles of the same type connected to each other with minimal space between them.
Figure 4:
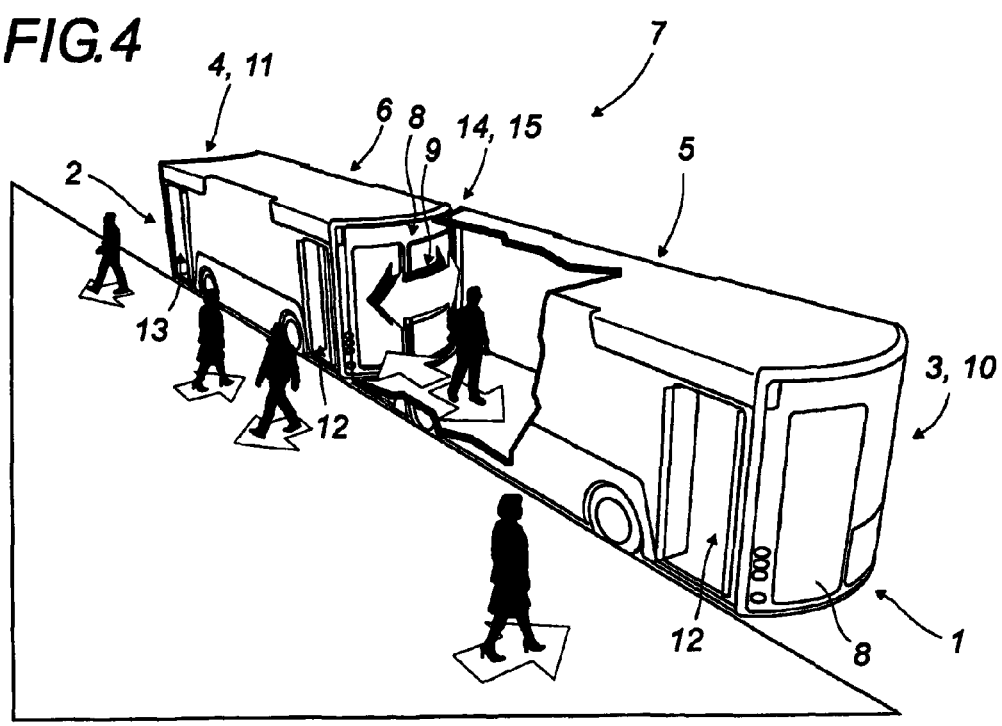
FIG. 4 is a schematic perspective with a cut-away showing a communicating door opening between vehicles.

The road vehicle according to the invention, motorized and either independently supplied with energy or connected to an energy supply network as shown schematically in FIG. 1, has a front portion 1 and a rear portion 2 forming a front surface 3 and a rear surface 4.

When two vehicles, one a front leading vehicle 5 and the other a rear trailing vehicle 6, are connected to each other and positioned in straight line to constitute a series or a road train 7, corresponding surfaces 3 and 4 are opposite each other. Each surface 3 and 4 is equipped with at least one communicating door, 8 and 9, respectively.

It is preferable for the facing surfaces to be curved, curvilinear, arc-shaped, or otherwise rounded since these shapes incur the least risk of interference on curves when vehicles 5 and 6 are hitched together.

An example of this is the circular shapes, one convex shape 10 at the front and one concave shape 11 at the rear, shown in the first drawings.

The motorized vehicle according to the invention also comprises front lateral doors 12 and rear lateral doors 13 allowing passengers to enter and exit.

The motorized road vehicle according to the invention is capable of functioning alone and independently like a simple road vehicle for passenger transportation, but also in another mode called the group mode in which it is connected to other road vehicles forming a series or a road train 7. In this group mode only the head vehicle has a driver. In the series or road train 7, one or more other vehicles may utilize their energy source at full power or at partial or reduced power. In theory the following vehicles have no driver.

In group mode, two successive vehicles 5 and 6 are articulated to each other forming an intermediate space 14 used as an passageway for travelers or passengers moving from one vehicle to another, called the intercommunicating gangway 15.

The motorized road vehicle according to the invention is predisposed for this second use by virtue of its split front and rear hitching devices.

For this purpose it comprises in the front splittable connection and orientation elements 16 capable of being connected to complementary elements on the rear of another leading road vehicle so as to constitute a complete articulated splittable connection that is either mechanical or virtual in order to form a series or a road train 7 of at least two road vehicles: one a leading vehicle 5 and one a trailing vehicle 6, in which only the lead vehicle 5 of the series has a driver.

To achieve this, at the rear it comprises hitching elements 17 that can be connected together or can receive complementary splittable articulated connecting elements to connect it to another road vehicle and become its lead vehicle.

Insofar as the hitching devices at the front are concerned, as shown by way of example, they may consist of a drawbar 18 held below the front portion 1 of each vehicle and pivotably mounted on its chassis by a pivot center 19 cooperating with a directional assembly for setting the course of the following vehicle, acting on its directional assembly 20 so as to effect realignment of the connected vehicles after a curve and quasi-monotrace behavior by the trainling vehicle.

Drawbar 18 is pivotably mounted below the front portion of the vehicle, preferably in median longitudinal position and near the axis of the front axle of the vehicle.

The drawbar is mounted so that it remains within the perimeter of the vehicle's footprint on the ground.

Figure 5:
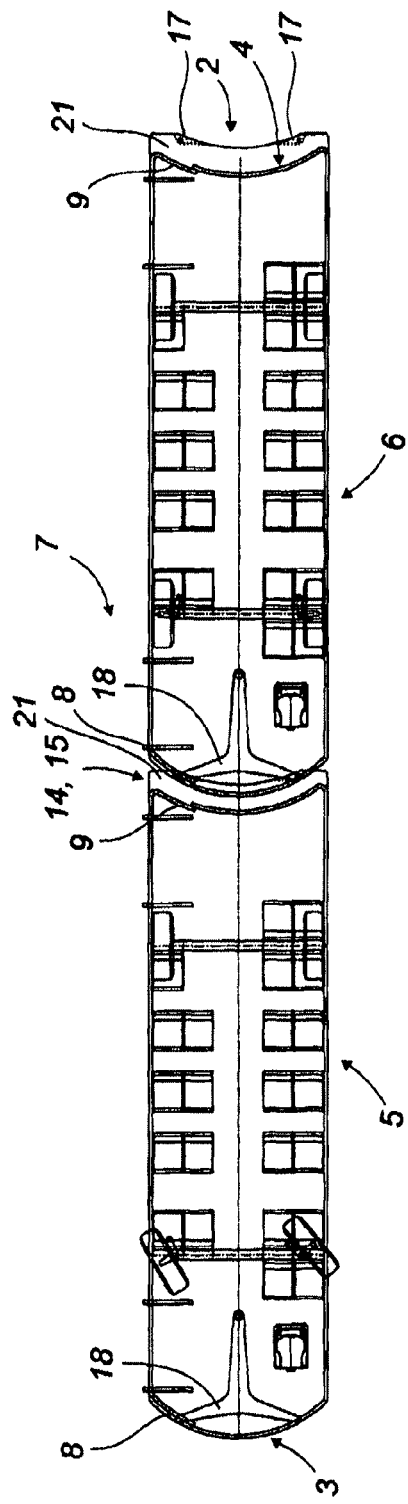
FIG. 5 is a plane view of several road vehicles connected to one another by an exemplary mechanical connection in a straight line configuration.
Figure 6:
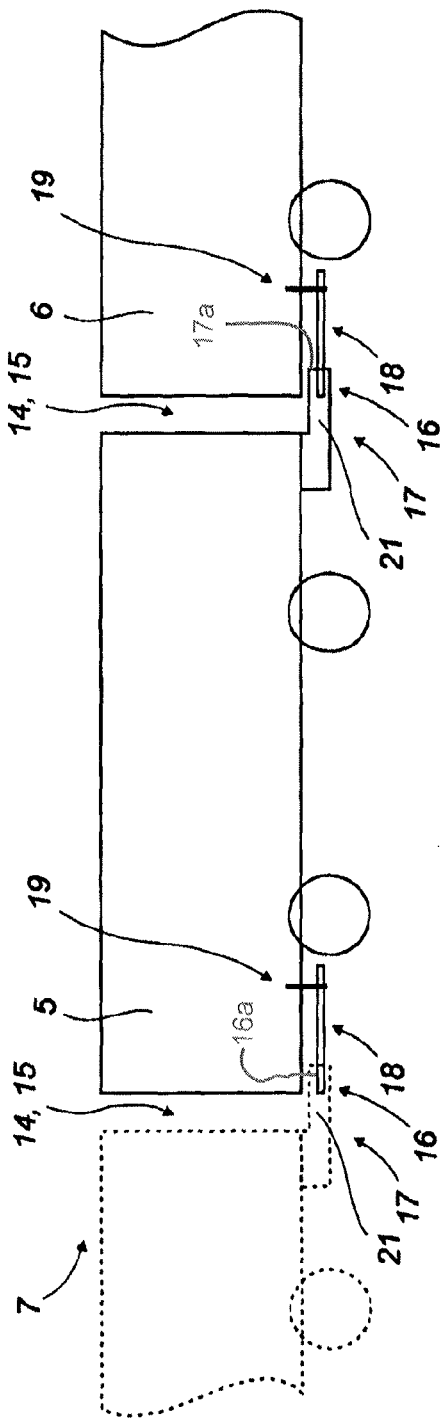
FIG. 6 is a profile view showing a series of several vehicles connected to one another using the exemplary mechanical connection in FIG. 5.

With regard to the devices for splitting the connection, they may consist of rapid coupling and uncoupling elements ensuring that the drawbar remains fixed in the direction of the median longitudinal axis of the leading road vehicle 5, as in the situations shown in FIGS. 5, 6 and 7.

Obviously care is taken to permit the roll and pitch displacement necessary for travel by allowing the appropriate amount of functional freedom and play.

The splitting means for the connection are those for the front portion of the road vehicle and those for the rear of it. They may be virtual type, that is, without physical connecting support, but operating through the use of sensors and connections through data-transmitting signals, all of which are controlled by a central processor.

The splittable connector, when joined, effects alignment of the vehicles and quasi-monotrace behavior by the following vehicle, but also and most importantly, ensures a short space between vehicles following one another, that is, between their opposite facing surfaces 3 and 4 when in a straight line and at least when stopped.

In this way a very short passageway, or actually the shortest possible passageway, is formed for passengers between one vehicle and the other, known by the expression intercommunicating gangway 15. This passageway can only be used by passengers during a stop in straight line configuration when the communicating doors are freed for opening.

When the intercommunicating gangway is short enough, protection can be dispensed with as passenger safety and prevention from intrusion are guaranteed. Thus it would be useless to provide a pneumatic connector.

The possible gap, that is, the free space, that may exist at the lower portion of the intercommunicating gangway may be bridged by a rear projection such as projection 21 level with the thresholds of doors 8 and 9 and the floors of the adjacent vehicles with no change in incline or plane. This projection may be part of the rear of leading vehicle 5 as shown or conversely, part of the front of trailing vehicle 6, or it may also be part of both.

The invention also relates to an assembly formed of several road vehicles such as vehicles 5 and 6 that are identical or similar to those described above, joined to one another to form a series or a road train 7 with a short intercommunicating gangway 15 that is without protection such as a pneumatic connector, for example.

This series or this train of road vehicles 7 connected to one another by a short intercommunicating gangway 15 is driven by a single driver located in the head vehicle.

The invention claimed is:

1. A motorized leading road vehicle, for transporting passengers, capable of traveling and operating alone, either independently motorized or connected to an energy network, which is connectable and articulated to at least another following road vehicle that is one of identical or of the same type to form a road train (7) of at least the leading and the following road vehicles, each of the leading and the following vehicles comprising a front directional assembly (20), a forward facing surface (3) and a rear facing surface (4), the leading road vehicle comprises:

splittable front connection and orientation elements (16) that comprise first coupling and uncoupling elements (16a), the splittable front connection and orientation elements (16) always being located within a perimeter of a vehicle's ground footprint and being pivotably mounted below a chassis at a front of the respective road vehicle on a median longitudinal axis of the respective road vehicle and near the front directional assembly (20);

rear hitching devices (17) which comprise second coupling and uncoupling elements (17a) that are complementary to the first coupling and uncoupling elements (16a) on the splittable front connection and orientation elements (16);

the leading road vehicle being articulatable to the following road vehicle to form a road train (7) of at least the leading and the following road vehicles, an intermediate space (14), existing between the road train (7) of at least the leading and the following road vehicles, constitutes an intercommunicating gangway (15) for passengers to circulate from one adjacent road vehicle to another adjacent road vehicle of the road train (7);

the first coupling and uncoupling elements (16a) for the splittable front connection and orientation elements (16) on the following road vehicle (6) are connected to the second coupling and uncoupling elements (17a) for the rear hitching devices (17) on the leading road vehicle (5);

the splittable front connecting and orientation elements (16) on the following road vehicle (6) and the rear hitching devices (17) of the leading road vehicle (5) connected by the respective first and second coupling and uncoupling elements (16a, 17a) constitute a splittable articulated and disconnectable connection of a mechanical, non-driven, which imposes a constant space between the leading (5) and the following road vehicles (6), the constant space, which allows the passengers to pass longitudinally from one adjacent road vehicle to another adjacent road vehicle (5, 6) of the road train (7), being a minimal distance to facilitate the passage of travelers transversely between the road train (7) thus articulated to access an interior of the one or the other of the leading and the following road vehicles; and a directional guide system for controlling the course of the following vehicle (6) from the leading vehicle (5).

2. The leading road vehicle according to claim 1, wherein the splittable front connecting and orientation elements (16) comprise a drawbar (18).

3. The leading road vehicle according to claim 1, wherein the coupling and uncoupling elements facilitate substantially rapid coupling and uncoupling of the splittable front connecting and orientation elements (16) and the rear hitching devices (17).

4. The leading road vehicle according to claim 1, wherein the first coupling and uncoupling elements (16a) of the splittable front connecting and orientation elements (16) comprises a substantially short disconnectable hitching device.

5. The leading road vehicle according to claim 1, wherein the forward facing surface (3) and the rear facing surface (4) are curved.

6. The leading road vehicle according to claim 5, wherein the curve of the forward facing surface (3) is convex and the curve of the rear facing surface (4) is concave.

7. The leading road vehicle according to claim 1, wherein each road vehicle of the road train (7) comprises a communicating door (8, 9) provided in each of the forward facing surface (3) and the rear facing surface (4).

8. The leading road vehicle according to claim 1, wherein the leading the following road vehicles each comprises front (12) and rear (14) lateral doors for passengers to enter and exit the respective road vehicle.

9. The leading road vehicle according to claim 1, wherein the leading and the following road vehicles each comprises either a projection (21) at one of the front and at the rear, or a projection (21) at both of the front and at the rear of the respective road vehicle, forming a lower portion of the intercommunicating gangway (15) when the leading road vehicle (5) is articulated to the following road vehicle (6) to constitute the road train (7).

10. The leading road vehicle according to claim 9, wherein the projection (21) is level with a threshold of a corresponding communicating door (8, 9) and with a floor of one of the leading and the following road vehicle (5, 6).

11. The leading road vehicle according to claim 9, wherein the lower portion of the intercirculating gangway (15) of the road train (7) is occupied by either a single projection (21) forming part of one of the rear of the leading road vehicle (5) and the front of the following road vehicle (6), or by two projections, one forming part of the rear of the leading road vehicle (5) and the other, forming part of the front of the following road vehicle (6).

12. The leading road vehicle according to claim 11, wherein the lower portion of the intercirculating gangway (15) of the road train is level with thresholds of the communicating doors (8, 9) and with floors of the leading and following road vehicles (5, 6).

13. The leading road vehicle according to claim 1, wherein in the road train (7), the leading road vehicle (5) has a driver and the following road vehicle (6) follows a path set by the directional guide system.

14. The leading road vehicle according to claim 13, wherein a course setpoint of the directional guide system of the road train imposes a straight line alignment on all of the road vehicles which form the road train.

15. The leading road vehicle according to claim 14, wherein the course setpoint of the directional guide system of the road train imposes a quasi-monotrace trajectory.

16. The leading road vehicle according to claim 1, wherein the road train comprises communicating doors (8, 9) on the front facing surfaces (3) and the rear facing surfaces (4) of each road vehicle of the road train (7) that are freed to open during stops when the leading and the following road vehicles (5, 6) are in a straight line, so that the passengers can pass from a first one of the leading and the following road vehicles (5, 6) to a second one of the leading and the following road vehicles (5, 6).

* * * * *